US012789654B2

(12) United States Patent
Lucy

(10) Patent No.: US 12,789,654 B2
(45) Date of Patent: Nov. 10, 2026

(54) ELECTRIC CHARGING SYSTEM OF A VEHICLE

(71) Applicant: AMPERE S.A.S., Boulogne Billancourt (FR)

(72) Inventor: Philippe Lucy, Guyancourt (FR)

(73) Assignee: AMPERE S.A.S., Boulogne Billancourt (FR)

( * ) Notice: Subject to any disclaimer, the term of this patent is extended or adjusted under 35 U.S.C. 154(b) by 327 days.

(21) Appl. No.: 18/683,063

(22) PCT Filed: Sep. 7, 2022

(86) PCT No.: PCT/EP2022/074796

§ 371 (c)(1),
(2) Date: Feb. 12, 2024

(87) PCT Pub. No.: WO2023/041386

PCT Pub. Date: Mar. 23, 2023

(65) Prior Publication Data

US 2024/0351459 A1 Oct. 24, 2024

(30) Foreign Application Priority Data

Sep. 14, 2021 (FR) ....................................... 2109643

(51) Int. Cl.

*H01R 13/639* (2006.01)
*B60L 53/16* (2019.01)
*H01R 13/74* (2006.01)

(52) U.S. Cl.

CPC ............ *B60L 53/16* (2019.02); *H01R 13/639* (2013.01); *H01R 13/748* (2013.01); *H01R 2201/26* (2013.01)

(58) Field of Classification Search

None
See application file for complete search history.

(56) References Cited

U.S. PATENT DOCUMENTS

| | | | | |
|---|---|---|---|---|
| 10,625,623 | B2 * | 4/2020 | Lyon | H01R 13/633 |
| 11,059,376 | B2 * | 7/2021 | Sasaki | B60K 15/04 |
| 2013/0040486 | A1 | 2/2013 | Kurumizawa et al. | |
| 2019/0375300 | A1 | 12/2019 | Lyon | |
| 2020/0207226 | A1 | 7/2020 | Sasaki et al. | |

FOREIGN PATENT DOCUMENTS

| | | | | |
|---|---|---|---|---|
| DE | 102018123314 A1 * | 3/2020 | | B60L 53/16 |
| EP | 3 032 659 A1 | 6/2016 | | |

OTHER PUBLICATIONS

International Search Report Issued Dec. 14, 2022, in PCT/EP2022/074796, filed on Sep. 7, 2022, 2 pages.
French Search Report Issued May 27, 2022, in French Application 2109643, filed on Sep. 14, 2021, (with Translation of Categories 3 pages).

* cited by examiner

*Primary Examiner* — Tho D Ta
(74) *Attorney, Agent, or Firm* — Oblon, McClelland, Maier & Neustadt, L.L.P.

(57) ABSTRACT

An electric charging system of a vehicle intended to receive at least one electric charging member includes at least one connector, a connector support intended to be rigidly connected to the vehicle, and an actuator including a locking pin intended to lock the electric charging member in relation to the connector. The connector support includes a guide to receive an actuating arm intended to unlock the locking pin.

13 Claims, 5 Drawing Sheets

ELECTRIC CHARGING SYSTEM OF A VEHICLE

The present invention relates to the automobile industry, and more specifically to electric charging systems for motor vehicles, such systems being installed on hybrid or electric vehicles.

These hybrid or electric vehicles usually comprise an electric energy storage unit such as a battery, which is used to supply the vehicle with the electric energy to be transformed into the mechanical power required to drive the vehicle via a power train. Since the battery has to be regularly connected to an electric network to be recharged, hybrid or electric vehicles are fitted with electric charging systems to enable such recharging.

Hybrid or electric vehicles may therefore have an electric connector designed to cooperate with a matching electric connector of the electric network. The electric connector of the vehicles may equally be in the form of a male plug or a female plug, also referred to as a socket, the electric connector of the electric network being a matching male or female plug such that the two plugs fit into one another.

When the vehicle is being charged, the engagement of the two electric connectors can be secured by a locking pin that prevents the electric connector from being withdrawn from the electric network. Such a locking pin may for example be engaged in the electric connector of the electric network and form a restraint, thereby blocking the connector in position in relation to the electric connector of the vehicle. The electric connector can then only be removed from the electric network once the locking pin has been retracted, i.e. once it is no longer acting as a restraint.

If such a mechanism malfunctions, an emergency system to force the retraction of the locking pin is usually provided. The locking pin can notably be retracted manually using a puller, which can actuate a lever linked mechanically thereto. To do so, the lever is pulled upwards, i.e. away from the ground on which the vehicle is resting. However, such emergency systems including a puller have accessibility issues. This is because the connector of the vehicle is usually enclosed, making this puller difficult to access.

BRIEF SUMMARY

The present invention is intended to overcome this drawback by proposing an electric charging system in which the lever is not pulled but pushed upwards, such pushing being exerted by an actuating arm. This system thus addresses the accessibility issues in the prior art.

The present invention therefore primarily relates to an electric charging system for a vehicle intended to receive at least one electric charging member comprising at least one connector, a connector support intended to be rigidly connected to the vehicle, and an actuator comprising a locking pin intended to lock the electric charging member in relation to the connector. According to the invention, the connector support comprises guide means able to receive an actuating arm separate from the electric charging system, the actuating arm being intended to unlock the locking pin following insertion through said guide means.

Such an electric charging system is intended to be used to recharge a hybrid or electric vehicle. Such recharging is achieved by engaging the electric charging member and the connector, the support of which is rigidly connected to the vehicle. This electric charging member is therefore an electric connector of the electric network shaped to fit the connector of the electric charging system.

The locking pin is a pin that is inserted into the electric charging member and forms a stop for said member, thereby preventing it from being withdrawn from the connector when the vehicle is being recharged. It is then in the locked position. Such a locking pin must be able to adopt an unlocked position in which it is retracted, in order to release the electric charging member once the vehicle has been recharged. In the event of malfunction of this retraction, and if the locking pin is blocked in the locked position, the invention provides for the use of an actuating arm that can unlock it, this actuating arm being for this purpose seated in at least one guide formed in the electric charging system. The actuating arm is thus guided to the actuator in order to force the retraction of the locking pin to enable the electric charging member to be disconnected from the connector.

According to one feature of the invention, the electric charging system comprises the actuating arm.

The actuating arm can therefore be permanently in place, i.e. arranged near to the electric charging system, or arranged elsewhere in the vehicle, for example in a storage compartment of this vehicle such as a glove box.

The actuating arm is a rigid rod with a diameter of between 6 mm and 8 mm. This rigid rod may be a tool designed specifically to unlock the locking pin, but may also take the form of a pencil, for example.

According to another feature of the invention, the actuating arm is intended to cooperate with a lever mechanically linked to the locking pin.

This lever is an element of the actuator, the actuator also comprising the locking pin. The lever and the locking pin are linked mechanically such that actuation of the lever results in reciprocal actuation of the locking pin.

Said guide means comprise at least one guide able to receive the actuating arm.

Preferably, said guide means comprise a plurality of guides able to receive the actuating arm, notably at least two guides aligned on a single axis.

Even more preferably, said guide means comprise three guides aligned on a single axis.

The presence of several aligned guides forms a guide axis for the actuating arm, thereby facilitating the handling thereof.

According to one feature of the invention, the three guides comprise a first guide, a second guide and a third guide, at least one of the second and third guides being arranged vertically above the first guide.

The first guide, the second guide and the third guide are aligned in this order, the first guide and the third guide being separated by a distance of at least 100 mm.

"Arranged vertically above" means that at least the second guide or the third guide is above the first guide when the electric charging system is installed on the vehicle, the vertical direction then being perpendicular to the ground on which this vehicle is resting.

According to another feature of the invention, said guide means, notably the first guide, comprise a guide chamfer.

The presence of such a guide chamfer facilitates insertion of the actuating arm into the guide. Where this is a plurality of guides, each guide may comprise a guide chamfer, or the electric charging system may have a single guide chamfer arranged on the first guide. The chamfer centers the actuating arm, which enables it to be positioned blind.

According to one feature of the invention, the axis passes through the lever.

The lever therefore faces at least one guide, such that the actuating arm is arranged to come into contact with this lever when the actuating arm is inserted into at least one guide, preferably two guides.

According to one feature, the connector support comprises fastening lugs for fastening the connector support to at least one structural element of the vehicle, and a rectangular portion surrounding the connector, said guide means being formed on a reinforcement arranged between at least one of the fastening lugs and the rectangular portion.

The connector support thus forms a frame for the connector, which is arranged inside this rectangular portion. This connector support comprises fastening lugs enabling it to be rigidly connected to the vehicle to which it is intended to be fitted, the at least one guide being arranged between one of these fastening lugs and the rectangular portion on a reinforcement that extends between these two elements.

According to one feature of the invention, said guide means are a hole formed in the connector support.

Alternatively, said guide means are a guide fork formed in the connector support.

The holes improve the precision of the guidance of the actuating arm, while the guide forks have the advantage of simplifying the manufacture of the mold of the connector support in which they are formed.

The invention also relates to a vehicle, notably an electric-drive vehicle, comprising an electric charging system as described above.

The vehicle may comprise a base intended to receive at least one hinge of a hood fitted to the vehicle, the connector support being rigidly connected to the base.

Such a base is attached by welding to a rail of the vehicle.

According to one feature of the invention, the vehicle is designed to enable the actuating arm to be inserted into said guide means through an inside of a front wing.

The actuating arm may be inserted through the front wing in different ways: either a dirt shield of the vehicle has an opening through which the actuating arm is inserted in order to reach the electric charging system, or the vehicle is designed such that the dirt guard has to be removed to enable the actuating arm to access the electric charging system.

The invention also relates to a method for unlocking an electric charging system as described above, comprising a first step that involves inserting the actuating arm through said guide means, a step of moving the actuating arm in translation until it comes into contact with the actuator, and a step of moving the locking pin.

The actuating arm is inserted into said guide means, for example the first guide, using the guide chamfer. It then slides in this guide until it butts against the actuator, and more specifically against the lever of this actuator. The lever is then pushed away from the at least one guide in a vertical direction, and it transmits the action to the locking pin, which is moved into the unlocked position in which the electric charging member can be released from the connector.

BRIEF DESCRIPTION OF THE DRAWINGS

Other features, details and advantages of the invention are set out more clearly in the description below as well as in example embodiments provided by way of non-limiting examples with reference to the attached drawings, in which.

DETAILED DESCRIPTION

The features, variants and different embodiments of the invention may be associated with one another in different combinations, where not incompatible with one another or mutually exclusive. Notably, variants of the invention that only include a selection of the features described below separately from other described features are also possible, where this selection of features is sufficient to provide a technical advantage and/or to differentiate the invention from the prior art.

In the figures, the elements common to several figures have the same reference number.

In the detailed description below, the terms "longitudinal", "transverse" and "vertical" refer to the orientation of the electric charging system according to the invention. A longitudinal direction corresponds to the main direction of extension of the equipped vehicle, this longitudinal direction being parallel to longitudinal axis L of a coordinate system L, V, T illustrated in the figures. A vertical direction corresponds to a direction perpendicular to the ground on which the vehicle is resting, this vertical direction being parallel to a vertical axis V of the coordinate system L, V, T and this vertical axis V being perpendicular to the longitudinal axis L. Finally, a transverse direction corresponds to a direction parallel to a transverse axis T of the coordinate system L, V, T, this transverse axis T being perpendicular to the longitudinal axis L and to the vertical axis V.

Figure 1:
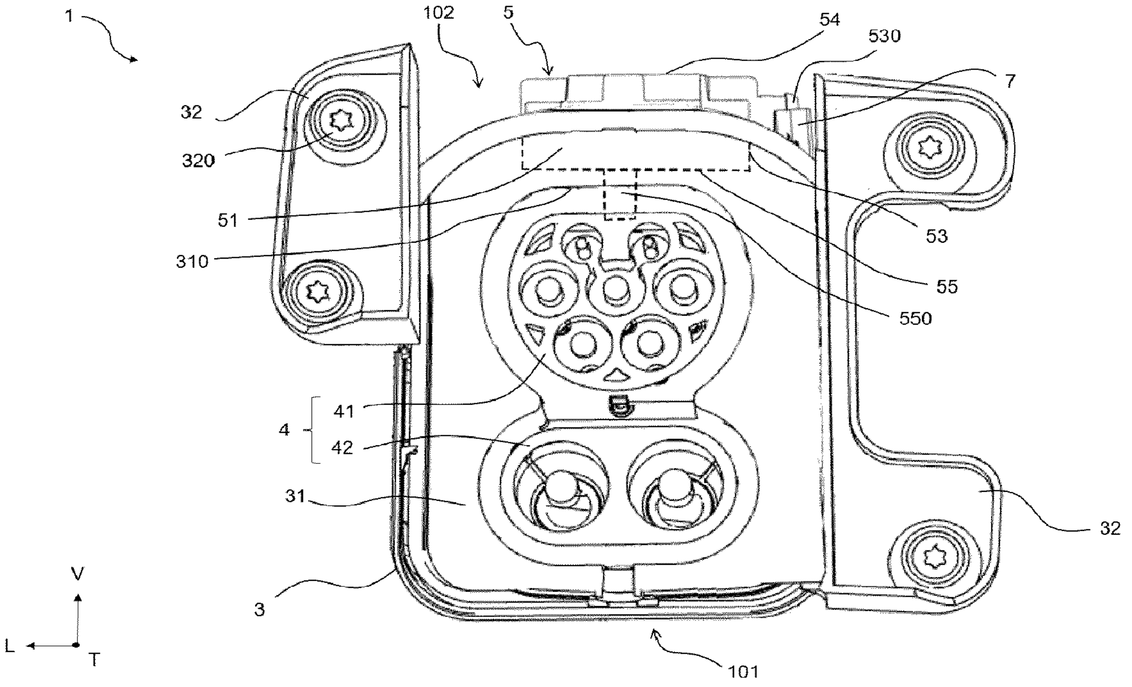
FIG. 1 is a schematic front view of an electric charging system according to the invention.
Figure 2:
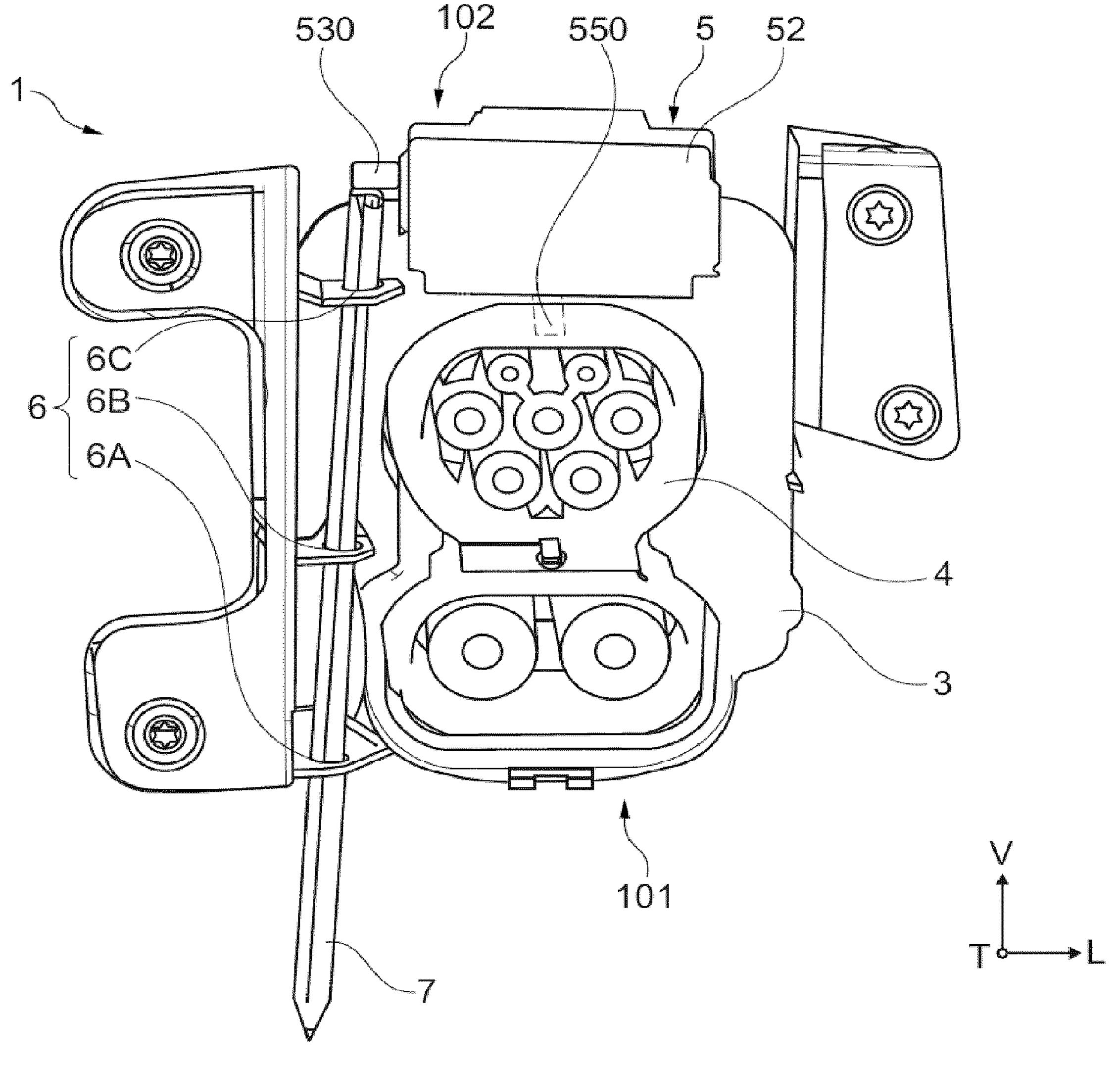
FIG. 2 is a rear view of the electric charging system in FIG. 1.

FIGS. 1 and 2 schematically illustrate an electric charging system 1 according to the invention from the front and rear respectively. Such an electric charging system 1 is intended to be fitted to a hybrid or electric vehicle 2 to enable said vehicle to be recharged. This electric charging system 1 extends primarily in a longitudinal/vertical plane and has a first vertical end 101 facing the ground on which the vehicle 2 is resting when rigidly connected thereto, and a second vertical end 102 that is remote from the ground and opposite the first vertical end 101.

Figure 4:
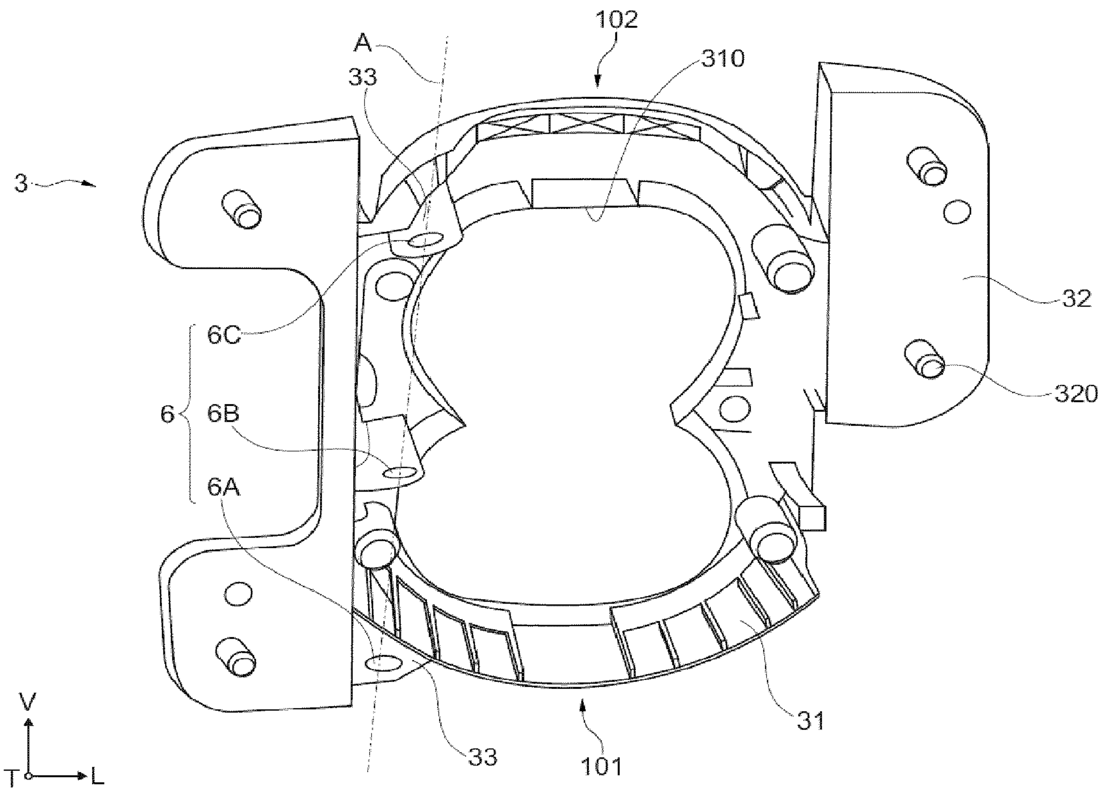
FIG. 4 is a rear view of an insulated connector support of the electric charging system in FIG. 1.

The electric charging system 1 comprises a connector support 3, shown from the rear in FIG. 4, that surrounds a connector 4. The connector support 3 comprises a rectangular portion 31, which forms a frame for this connector 4, and fastening lugs 32 arranged on each side of the rectangular portion 31 in the longitudinal direction. These fastening lugs 32 enable the connector support 3 to be fastened to the vehicle 2 to which it is rigidly connected. For this purpose, they have fastening means 320, in this case screws, that pass through the fastening lugs 32 from one side to the other in the transverse direction, so as to engage in a base 28 of the vehicle, such a base 28 being visible in FIG. 6. The fastening lugs 32 are not symmetrical and have different shapes, in this case enabling adaptation of the fastening of the connector support 3 to the base 28.

The connector 4 is in this case split into a main connector 41 and an additional connector 42, the main connector 41 corresponding to a slow recharge of the vehicle, while the additional connector 42 enables a rapid recharge of the vehicle. Each of these connectors 41 and 42 can receive a charging member 10 linked to an electric network, such an electric charging member 10 being shown in FIG. 3. This electric charging member 10 may notably take the form of a male plug able to cooperate with the connector 4, which is a female plug. Alternatively, the connector 4 may be a male plug and the electric charging member 10 a female plug.

The electric charging system 1 comprises an actuator 5, which is a housing arranged in the vicinity of the second vertical end 102. This actuator 5, which is particularly visible in FIG. 2, is not in the same plane as the rectangular portion 31 of the connector support 3, but is set back therefrom when the electric charging system 1 is viewed from the front. The actuator 5 is substantially rectangular. It has a front face 51 facing the connector support 3, opposite a rear face 52 facing the base 12 of the vehicle 2. It also has two side faces 53 that are opposite one another in the longitudinal direction and join the front face 51 and the rear face 52, as well as a top face 54 and a bottom face 55 that are opposite one another in the vertical direction, the bottom face 55 facing the ground on which the vehicle 2 is resting. These faces 51, 52, 53, 54 and 55 define the housing of the actuator 5.

Figure 3:
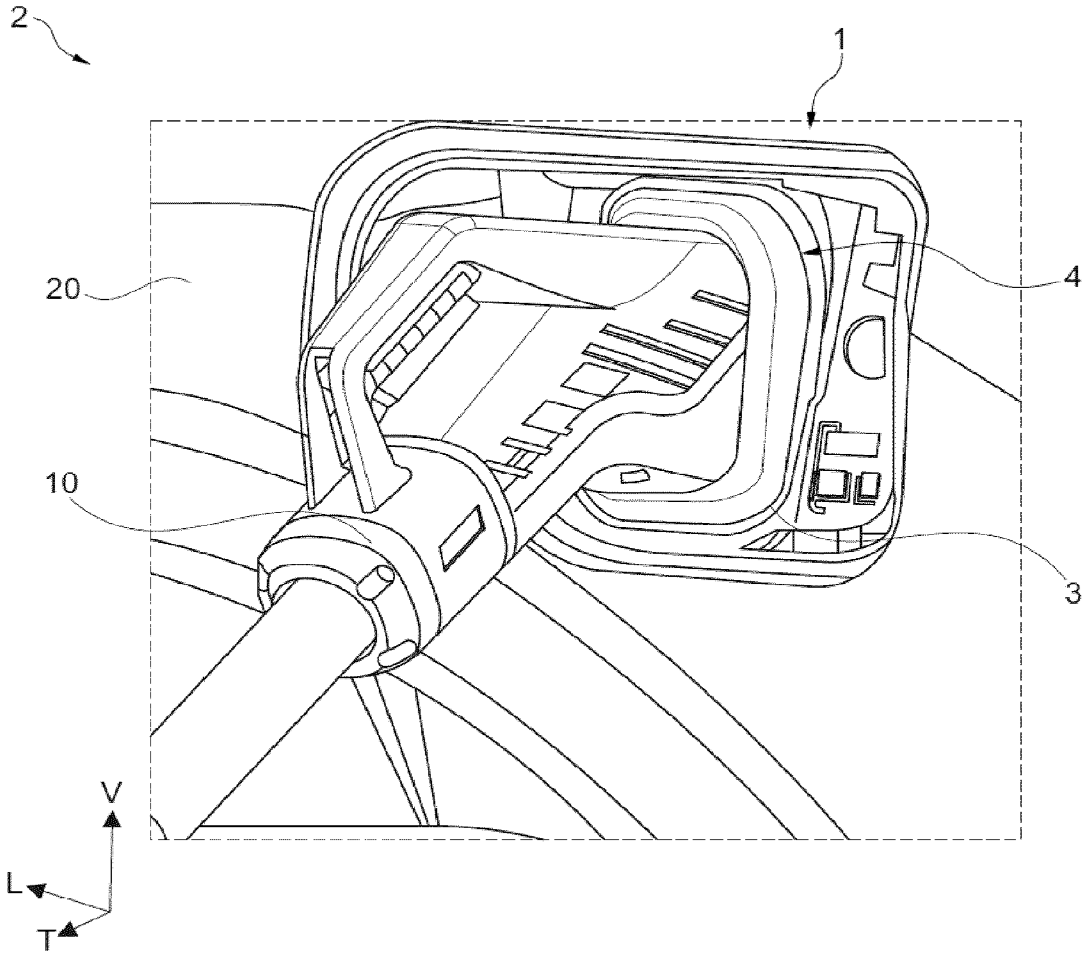
FIG. 3 shows the electric charging system in FIG. 1 receiving an electric charging member.

This actuator 5 has a locking pin 550 that extends perpendicularly away from the bottom face 55. Such a locking pin 550 is shown using dotted lines in FIGS. 1 and 2. This locking pin 550 enables the electric charging member 10 to be locked in relation to the connector 4, rigidly connecting them when the electric charging member 10 is connected to the connector 4, as shown in FIG. 3, notably while the vehicle 2 is being recharged. To this end, the locking pin 550 can be at least partially retracted into the housing of the actuator 5. The locking pin 550 can therefore have a high position, or unlocked position, in which it is at least partially retracted into the housing of the actuator 5, and a low position, or locked position, in which it is not retracted and projects from the bottom face 55. The electric charging member 10 is therefore locked when the locking pin 550 is in the low position. It then passes through a partition 310 of the rectangular portion 31 surrounding the connector 4, and also partially passes through the electric charging member 10. The locking pin 550 is therefore inserted simultaneously into the connector 4 and into the electric charging member 10. It thus forms a stop for the latter and restrains it by preventing it from moving in translation in the transverse direction, such a translational movement corresponding to a withdrawal of the electric charging member 10 from the connector 4. Conversely, the connector 4 and the electric charging member 10 may be disconnected when the locking pin 550 is in the high position, since it is then no longer acting as a stop.

The actuator 5 further comprises a lever 530 that is arranged on one of the side faces 53. This lever 530 constitutes an emergency system in the event malfunction of the locking pin 550 to which it is mechanically linked, notably when it is blocked in the low position. Thus, actuating the lever 530 in a vertical direction, and more specifically moving it away from the ground on which the vehicle 2 is resting, forces the locking pin 550 to be retracted.

Since the electric charging system 1 is arranged on the vehicle 2, as described in greater detail below with reference to FIG. 6, the lever 530 cannot however be actuated directly. An intermediary must therefore be used to reach this lever 530, for example an actuating arm 7. Such an actuating arm 7 is a rigid rod, preferably with a diameter of between 6 mm and 8 mm. It may be a tool designed specifically to actuate the lever 530, or an object such as a pencil, as shown in the figures, a drill bit or a screwdriver shaft. This actuating arm 7 may be permanently in place, i.e. near to the electric charging system 1, or arranged in a passenger compartment 21 of the vehicle 2.

According to the invention, the guide means 6 comprise at least one guide 6A, 6B or 6C able to receive this actuating arm 7.

The guide means may comprise two guides 6A and 6C, defining the guide axis for the actuating arm. More specifically, said guide means 6 comprise three guides 6A, 6B and 6C, as in the embodiments represented herein. Said guides 6A, 6B, 6C may notably be through-holes or guide forks, as in the specific embodiment shown in FIG. 5.

The three guides 6A, 6B, 6C are aligned on a single axis A, through which the lever 530 also passes. The three guides 6A, 6B, 6C and the lever 530 are therefore aligned on this axis A. This alignment creates a guide axis for the actuating arm 7, which is inserted into the guide means 6 to come into contact with this lever 530 and to actuate it to unlock the locking pin 550. In this case, “actuate” means that the lever 530 is pushed upwards by the actuating arm 7, i.e. away from the ground on which the vehicle 2 is resting.

The guide means 6 are shown without the actuating arm 7 in FIG. 4, which shows the connector support 3 from the rear. These guide means 6 are formed in the connector support 3. More specifically, the guides 6A, 6B, 6C are arranged on reinforcements 33 that extend between the rectangular portion 31 and one of the fastening lugs 32. Such reinforcements 33 are plates substantially perpendicular to the vertical direction that create a joint between this rectangular portion 31 and this fastening lug 32. The reinforcements 33 extend backwards from the connector support 3, i.e. on a face thereof opposite the face receiving the electric charging member 10.

The guide means 6 may comprise a first guide 6A, a second guide 6B and a third guide 6C that are aligned in this order so that the first guide 6A is in the vicinity of the first vertical end 101 of the electric charging system 1 and the third guide 6C is in the vicinity of the second vertical end 102 thereof. The third guide 6C is therefore arranged vertically above the second guide 6B, which is itself arranged vertically above the first guide 6A, this arrangement being determined according to the distance of the guides 6A, 6B, 6C from the ground on which the vehicle 2 is resting. This arrangement of the guides 6A, 6B, 6C and the alignment thereof with the lever 530 along the axis A means that the third guide 6C faces the lever 530.

Advantageously, the first guide 6A and the third guide 6C are separated by a distance of at least 100 mm. The second guide 6B, which is arranged between these two guides, is preferably closer to the first guide 6A than to the third guide 6C, i.e. closer to the first vertical end 101 than to the second vertical end 102. This second guide 6B may therefore be positioned between one third and one half of the distance between the first guide 6A and the third guide 6C. This specific arrangement facilitates the use of the actuating arm 7 by a user, who is working blind as a result of the arrangement of the electric charging system 1 on the vehicle 2.

Figure 5:
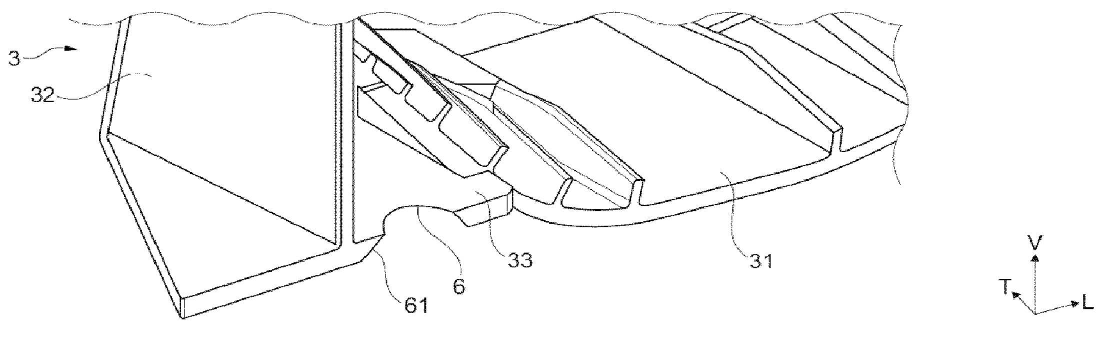
FIG. 5 is a schematic view of a guide for the electric charging system in FIG. 1.

To make the actuating arm 7 even simpler for the user to use, the first guide 6A may have a guide chamfer 61, as shown in FIG. 5. Such a guide chamfer 61 has the advantage of facilitating insertion of the actuating arm 7 into the first guide 6A, this actuating arm 7 being guided towards the light of the hole as it slides on this guide chamfer 61.

The electric charging system 1 may be unlocked using an unlocking method that comprises a first step that involves inserting the actuating arm 7 into the first guide 6A. The user positions the actuating arm 7 at the first vertical end 101 of the electric charging system 1 and slides this actuating arm 7 into the through-hole or the fork that constitutes the first guide 6A, with the help of the guide chamfer 61. The next step of the unlocking method involves moving the actuating arm 7 in translation, during which it slides in the other guides 6B and/or 6C along the axis A, towards the second vertical end 102. The actuating arm 7 moves in translation until it comes into contact with the actuator 5, and more specifically with the lever 530 facing the third guide 6C. The unlocking method is concluded with a step of moving the locking pin 550. To do so, the actuating arm 7 butts against then pushes the lever 530, to actuate the lever by moving it away from the third guide 6C. The lever 530 in turn actuates the locking pin 550 by means of a mechanism inside the actuator 5, and this locking pin 550 is retracted, switching from a low position to a high position. Once unlocked, the locking pin 550 no longer acts as a stop for the electric charging member 10, which can then be disconnected from the connector 4 into which had been inserted.

Figure 6:
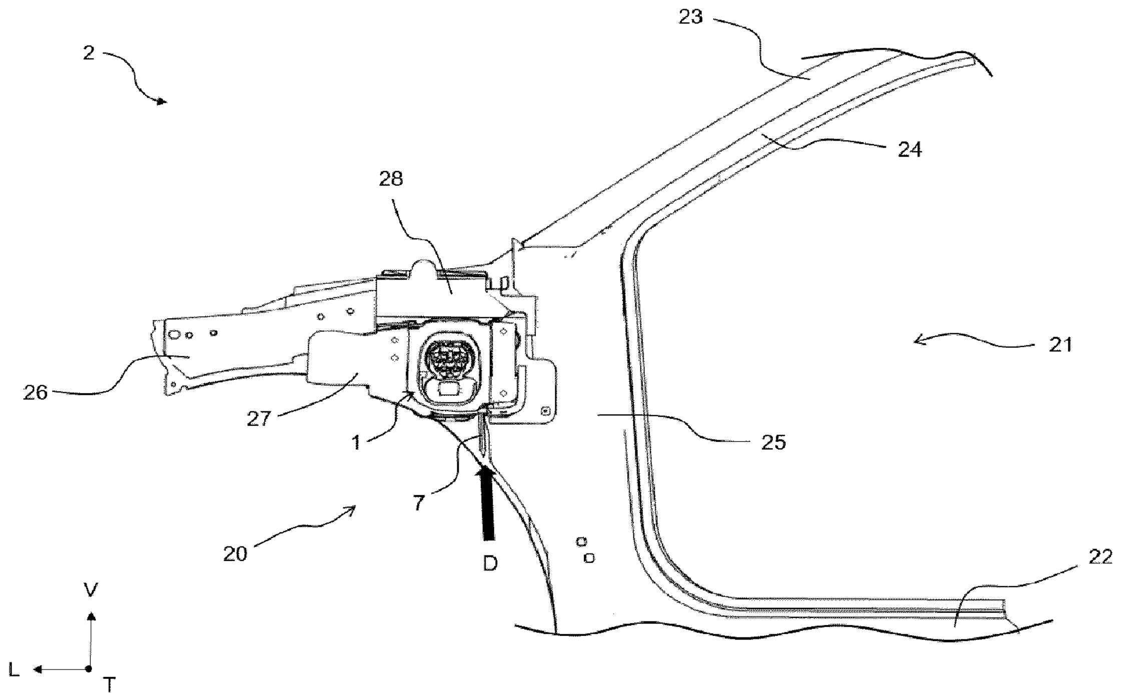
FIG. 6 shows a vehicle fitted with the electric charging system in FIG. 1.

FIG. 6 shows a portion of a front wing 20 of a vehicle 2 fitted with the electric charging system 1 according to the invention. Some parts of this front wing 20 have been removed in the figure so as to facilitate comprehension of the invention.

The vehicle 2 comprises a passenger compartment 21 that is delimited vertically by a sill 22 at the bottom of the passenger compartment near to the ground, and by a windscreen pillar 24 remote from the ground, this windscreen pillar 24 being fitted with a windscreen 23. The sill 22 and the windscreen pillar 24 are joined by a front pillar 25. This front pillar 25 extends in a direction substantially perpendicular to the ground, while the sill 22 is parallel to the ground. A rail 26 extends away from the front pillar 25, in a longitudinal direction away from the passenger compartment 21.

The electric charging system 1 is rigidly connected to the front wing 20 at the joint between the front pillar 25 and the rail 26. Here it is partially covered by an intermediate part 27 that is arranged between the connector support 3 and a body of the vehicle 2 (not shown in this view).

The electric charging system 1 is rigidly connected to the vehicle 2 by means of a base 28 that is intended to receive at least one hinge of a hood (not shown here). This base 28 is attached by welding to the rail 26. The connector support 3 is fastened to this base 28 using the fastening lugs 32 and the fastening means 320 described above with reference to FIGS. 1 and 2.

The vehicle 2 may comprise a dirt shield at least partially covering the electric charging system 1, and more specifically said guide means 6. To make the electric charging system 1 accessible when implementing the unlocking method described above, such a dirt shield may be fitted with an opening through which the actuating arm 7 can pass. Alternatively, this dirt shield may be removed from the vehicle 2 to facilitate access to said guide means 6. The vehicle 2 is therefore designed so that the actuating arm 7 can be inserted into said guide means 6 through an inside of the front wing 20 in the direction indicated in FIG. 6 by the arrow D.

The present invention thus proposes an electric charging system fitted with an emergency system that is used to force the unlocking of a locking pin that is used to block an electric charging member in position in a connector of this electric charging system when recharging a hybrid or electric vehicle.

The present invention is by no means limited to the means and arrangements described and illustrated herein, and it also covers any equivalent means or arrangements and any technically operational combination of such means.

The invention claimed is:

1. An electric charging system of a vehicle configured to receive at least one electric charging member, comprising:

at least one connector;

a connector support configured to be rigidly connected to the vehicle; and an actuator comprising a locking pin configured to lock the electric charging member in relation to the connector, wherein the connector support comprises guide means to receive an actuating arm configured to unlock the locking pin, wherein said guide means comprise a plurality of guides configured to receive the actuating arm, wherein said plurality of guides includes at least two guides aligned on a single axis, and wherein the actuating arm is configured to cooperate with a lever mechanically linked to the locking pin, and the axis passes through the lever.

2. The electric charging system as claimed in claim 1, wherein the electric charging system comprises the actuating arm.

3. The electric charging system as claimed in claim 1, wherein said guide means comprise a guide chamfer.

4. The electric charging system as claimed in claim 1, wherein the connector support comprises fastening lugs for fastening the connector support to at least one structural element of the vehicle, and a rectangular portion surrounding the connector, the guide means being formed on a reinforcement arranged between at least one of the fastening lugs and the rectangular portion.

5. The electric charging system as claimed in claim 1, wherein said guide means are a hole formed in the connector support.

6. An unlocking method for the electric charging system as claimed in claim 1, the method comprising:

inserting the actuating arm through said guide means;

moving the actuating arm in translation until it comes into contact with the actuator; and moving the locking pin.

7. The electric charging system as claimed in claim 1, wherein the actuating arm is a rigid rod with a diameter of between 6 mm and 8 mm.

8. The electric charging system as claimed in claim 1, wherein the lever is arranged on a side face of the actuator.

9. The electric charging system as claimed in claim 1, wherein the lever is mechanically linked to the locking pin such that a vertically upward movement of the lever forces the locking pin to be retracted into a housing of the actuator.

10. The electric charging system as claimed in claim 1, wherein said guide means comprise three guides aligned on the single axis.

11. The electric charging system as claimed in claim 10, wherein the three guides comprise a first guide, a second guide, and a third guide, at least one of the second and third guides being arranged vertically above the first guide.

12. A vehicle, comprising:

the electric charging system as claimed in claim 1.

13. The vehicle as claimed in claim 12, wherein the vehicle is configured to enable the actuating arm to be inserted into said guide means through an inside of a front wing.

* * * * *